United States Patent
Gigliotti

(10) Patent No.: US 10,110,650 B2
(45) Date of Patent: *Oct. 23, 2018

(54) CLIENT SIDE STREAM SWITCHING

(71) Applicant: Amazon Technologies, Inc., Seattle, WA (US)

(72) Inventor: Samuel S. Gigliotti, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/684,168

(22) Filed: Apr. 10, 2015

(65) Prior Publication Data

US 2015/0215361 A1 Jul. 30, 2015

Related U.S. Application Data

(63) Continuation of application No. 12/134,988, filed on Jun. 6, 2008, now Pat. No. 9,047,236.

(51) Int. Cl.
| | |
|---|---|
| *G06F 15/16* | (2006.01) |
| *H04L 29/06* | (2006.01) |
| *H04L 12/835* | (2013.01) |
| *H04L 29/08* | (2006.01) |

(52) U.S. Cl.
CPC .............. *H04L 65/60* (2013.01); *G06F 15/16* (2013.01); *H04L 47/30* (2013.01); *H04L 67/10* (2013.01)

(58) Field of Classification Search
CPC .......... H04L 47/30; H04L 65/60; H04L 67/10
See application file for complete search history.

(56) References Cited

U.S. PATENT DOCUMENTS

| | | | |
|---|---|---|---|
| 5,224,213 A | * | 6/1993 | Dieffenderfer ............ G06F 5/16 710/53 |
| 6,175,871 B1 | | 1/2001 | Schuster et al. |
| 6,243,497 B1 | | 6/2001 | Chiang et al. |

(Continued)

FOREIGN PATENT DOCUMENTS

| | | |
|---|---|---|
| JP | 11187367 | 7/1999 |
| JP | 2004135308 | 4/2004 |

(Continued)

OTHER PUBLICATIONS

The European Office Action dated Aug. 24, 2015 for European patent application No. 09759259.6, a counterpart foreign application of U.S. Appl. No. 12/134,988, 5 pages.

(Continued)

*Primary Examiner* — June Y Sison
(74) *Attorney, Agent, or Firm* — Lee & Hayes, PLLC

(57) ABSTRACT

Client side stream switching enables substantially uninterrupted transmission of a highest compatible bit rate of a stream of media to a client via a network connection. The client may include one or more buffers for receiving the stream of media. Attributes including the buffer activity and a bandwidth of the network connection may be monitored by a streaming module to determine an alternative bit rate of the stream of media. The stream of media may be transitioned from the first bit rate to the alternative bit rate without an interruption of the stream of media to provide the client with the highest compatible bit rate based on the monitored attributes.

20 Claims, 9 Drawing Sheets

(56) References Cited

U.S. PATENT DOCUMENTS

| | | | |
|---|---|---|---|
| 6,366,959 B1* | 4/2002 | Sidhu | H04J 3/0632 709/214 |
| 6,647,389 B1 | 11/2003 | Fitch et al. | |
| 6,789,123 B2 | 9/2004 | Li et al. | |
| 6,850,965 B2 | 2/2005 | Allen | |
| 7,075,584 B2 | 7/2006 | Crinon | |
| 7,224,691 B1 | 5/2007 | Yeluri et al. | |
| 7,346,007 B2 | 3/2008 | Curcio et al. | |
| 7,373,413 B1* | 5/2008 | Nguyen | H04N 21/23406 370/231 |
| 7,483,489 B2 | 1/2009 | Gentric et al. | |
| 8,151,019 B1 | 4/2012 | Le et al. | |
| 2002/0094031 A1 | 7/2002 | Ngai et al. | |
| 2002/0133247 A1 | 9/2002 | Smith et al. | |
| 2002/0154694 A1 | 10/2002 | Birch | |
| 2002/0165970 A1 | 11/2002 | Ludewig | |
| 2003/0021346 A1* | 1/2003 | Bixby | H04N 21/23424 375/240.25 |
| 2003/0165150 A1 | 9/2003 | Zimmermann et al. | |
| 2003/0236902 A1 | 12/2003 | Weiss et al. | |
| 2004/0128396 A1 | 7/2004 | Patrick et al. | |
| 2004/0153951 A1 | 8/2004 | Walker et al. | |
| 2004/0176111 A1 | 9/2004 | Wilhelm | |
| 2004/0202248 A1 | 10/2004 | Boroczky et al. | |
| 2004/0264489 A1 | 12/2004 | Klemets et al. | |
| 2004/0267983 A1 | 12/2004 | Oda | |
| 2005/0117580 A1 | 6/2005 | Del Val et al. | |
| 2006/0062292 A1 | 3/2006 | Boice et al. | |
| 2006/0109856 A1 | 5/2006 | Deshpande | |
| 2006/0143678 A1* | 6/2006 | Chou | H04N 21/23406 725/118 |
| 2006/0165166 A1 | 7/2006 | Chou et al. | |
| 2006/0198446 A1 | 9/2006 | Ribas-Corbera et al. | |
| 2006/0224762 A1 | 10/2006 | Tian et al. | |
| 2006/0242315 A1 | 10/2006 | Nichols | |
| 2006/0271979 A1 | 11/2006 | Hejna | |
| 2007/0002946 A1* | 1/2007 | Bouton | H04N 19/15 375/240.15 |
| 2007/0033633 A1* | 2/2007 | Andrews | H04N 21/23418 725/135 |
| 2007/0110168 A1 | 5/2007 | Kravtsov et al. | |
| 2007/0133405 A1* | 6/2007 | Bowra | H04L 12/2602 370/230 |
| 2007/0160127 A1 | 7/2007 | Ratakonda et al. | |
| 2008/0022005 A1 | 1/2008 | Wu et al. | |
| 2008/0091851 A1* | 4/2008 | Sierra | G06F 3/16 710/22 |
| 2008/0101461 A1 | 5/2008 | Person et al. | |
| 2008/0147786 A1 | 6/2008 | Liwerant et al. | |
| 2008/0151998 A1 | 6/2008 | He | |
| 2008/0172441 A1 | 7/2008 | Speicher et al. | |
| 2008/0195744 A1 | 8/2008 | Bowra et al. | |
| 2008/0195748 A1 | 8/2008 | Tierney et al. | |
| 2009/0144792 A1 | 6/2009 | Fielibert et al. | |
| 2009/0150219 A1 | 6/2009 | Headings et al. | |
| 2009/0235318 A1 | 9/2009 | Amsterdam et al. | |
| 2009/0282162 A1 | 11/2009 | Mehrotra et al. | |
| 2009/0300204 A1 | 12/2009 | Zhang et al. | |
| 2009/0307367 A1 | 12/2009 | Gigliotti | |
| 2010/0088425 A1 | 4/2010 | Hooda et al. | |
| 2010/0121977 A1 | 5/2010 | Kontola et al. | |
| 2010/0161825 A1 | 6/2010 | Ronca et al. | |
| 2010/0169453 A1 | 7/2010 | Biderman et al. | |
| 2010/0299552 A1 | 11/2010 | Schlack et al. | |
| 2011/0022705 A1 | 1/2011 | Yellamraju et al. | |
| 2011/0023072 A1 | 1/2011 | Hodzic et al. | |
| 2011/0040894 A1 | 2/2011 | Shrum et al. | |
| 2011/0047287 A1 | 2/2011 | Harrang et al. | |
| 2011/0093605 A1 | 4/2011 | Choudhury et al. | |
| 2011/0153860 A1 | 6/2011 | Hamel et al. | |
| 2011/0197237 A1 | 8/2011 | Turner | |
| 2012/0014254 A1 | 1/2012 | Todd et al. | |
| 2012/0222078 A1 | 8/2012 | Stahl et al. | |
| 2013/0095880 A1 | 4/2013 | Tzamaloukas | |

FOREIGN PATENT DOCUMENTS

| | | |
|---|---|---|
| JP | 2006115264 | 4/2006 |
| JP | 2008035102 | 2/2008 |
| JP | 2008537393 | 9/2008 |

OTHER PUBLICATIONS

Apostolopoulos et al., "Video Streaming: Concepts, Algorithms, and Systems", HP Laboratories, 2002, 35 pages.

The European Office Action dated Oct. 14, 2014 for European patent application No. 09759259.6, a counterpart foreign application of U.S. Appl. No. 12/134,988, 5 pages.

The Extended European Search Report dated Jun. 10, 2013 for European patent application No. 09759259.6, a counterpart foreign application of U.S. Appl. No. 09/759,259.6, 14 pages.

Hassoun, "Flash Media Server Article, Dynamic Stream Switching with Flash Media Server 3", Adobe—Developer Center, printed Jun. 6, 2008, found at http://www.adobe.com/devnet/flashmediaserver/articles/dynamic_stream_switching.html, 34 pages.

Translated Japanese Office Action dated Jul. 1, 2014 for Japanese patent application No. 2011-512585,5 a counterpart foreign application of U.S. Appl. No. 12/134,988, 6 pages.

Translated Japanese Office Action dated Sep. 3, 2013 for Japanese Patent Application No. 2011-512585, a counterpart foreign application of U.S. Appl. No. 12/134,988, 7 pages.

Office Action for U.S. Appl. No. 12/134,988, dated Oct. 1, 2014, Samuel S. Gigliotti, "Client Side Stream Switching", 29 pages.

Office action for U.S. Appl. No. 12/134,988, dated Nov. 7, 2012, Gigliotti, "Client Side Stream Switching", 30 pages.

Office Action for U.S. Appl. No. 12/643,719, dated Dec. 26, 2014, Samuel S. Gigliotti, "Dynamic Bandwidth Thresholds", 23 pages.

Non-Final Office Action for U.S. Appl. No. 12/135,034, dated Mar. 28, 2012, Siddharth Srirarm et al., "Stream Complexity Mapping", 24 pages.

Office action for U.S. Appl. No. 12/134,988, dated Mar. 28, 2013, Gigliotti, "Client Side Stream Switching", 46 pages.

Final Office Action for U.S. Appl. No. 12/643,719, dated Apr. 7, 2015, "Dynamic Bandwidth Thresholds", 23 pages.

Office Action for U.S. Appl. No. 12/135,034, dated May 7, 2014, Siddharth Sriram, "Stream Complexity Mapping", 17 pages.

Final Office action for U.S. Appl. No. 12/643,719, dated Jun. 27, 2012, Gigliotti et al., "Dynamic Bandwidth Thresholds", 21 pages.

Final Office Action for U.S. Appl. No. 12/135,034, dated Jul. 23, 2012, Siddharth Srirarm et al., "Stream Complexity Mapping", 41 pages.

Office action for U.S. Appl. No. 12/135,034, dated Sep. 30, 204, Sriram et al., "Stream Complexity Mapping", 24 pages.

Provisional U.S. Appl. No. 61/057,755 (filed date: May 30, 2008).

Provisional U.S. Appl. No. 61/057,759 (filed May 30, 2008).

Office Action for U.S. Appl. No. 12/643,719 dated Nov. 19, 2015, Freeman II, "Dynamic Bandwidth Thresholds", 26 pages.

Search Report and Written Opinion for PCT Application No. PCTUS0945995, dated Jul. 23, 2009 (8 pages).

The Extended European Search Report dated Jul. 4, 2017 for European patent application No. 17157820.6, 9 pages.

* cited by examiner

CLIENT SIDE STREAM SWITCHING

CROSS-REFERENCE TO RELATED APPLICATION

This application is a continuation of U.S. patent application Ser. No. 12/134,988, filed Jun. 6, 2008, which is incorporated herein by reference in its entirety.

BACKGROUND

It has become increasingly common for people to access media content over networks for use on computing devices. The Internet, in particular, has facilitated downloading and streaming of a wide availability of digital content. Many people are using network access to find, retrieve, and enjoy streaming media rather than relying on traditional content delivery methods such as over-the-air reception, cable transmission, satellite audio/video, and other distribution sources that push media to users typically on a scheduled basis that the user cannot control.

One particular difficulty with streaming media over the internet is limited bandwidth between a person's computing device and a host. Many people experience undesirable delays in receipt of streaming media or interruptions during play of the stream of media. One solution to expedite receipt of a stream of media to a computing device is to lower the quality of the media, such as by reducing a bit rate associated with the stream of media. However, people often desire the highest quality stream of media possible, which may vary based on a network connection bandwidth. Therefore, it is desirable to improve the quality of streaming media while reducing interruptions that people find undesirable while receiving streaming media.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

When a user receives streaming media, the user typically desires a high quality media stream without interruptions. However, many factors including bandwidth of a network connection between a host and a client may make it difficult to provide the user with both a high quality and an uninterrupted stream of media. In accordance with embodiments of the disclosure, a media stream of a first bit rate may be transmitted to the user which may ensure an uninterrupted or substantially uninterrupted stream of media. The host may then transition the stream of media to a higher or lower bit rate based on future bandwidth measurements, among other possible factors, to adjust the quality of the stream while the user receives an uninterrupted stream of media.

As discussed herein, a media stream may have a variable bit rate (VBR) or a fixed bit rate (FBR). A VBR includes a bit rate value that is representative of the stream of media, such as an average or median bit rate value. In VBR streams of media, portions of the stream of media may have higher or lower bit rate values. For example, an action scene of a video may be a complex portion and include a high bit rate value while another scene with little change in scenery, backdrop, etc., may not be complex and may have a low bit rate value. In contrast, FBR streams of media have a constant bit rate value. FBR streams typically adjust quality levels of the media based on the complexity of the stream of media, thus lowering quality during highly complex portions to keep the bit rate constant. As discussed herein, the bit rate may be either VBR or FBR unless otherwise specified.

For purposes of discussion, client side stream switching is described in the context of streaming audio and/or video from a host supporting a website. One illustrative implementation of this context is provided below. However, the described content style detection techniques may be implemented in other contexts. Moreover, other distribution configurations may be used to implement client side stream switching as performed by the illustrated architecture.

Illustrative System Architecture

Figure 1:
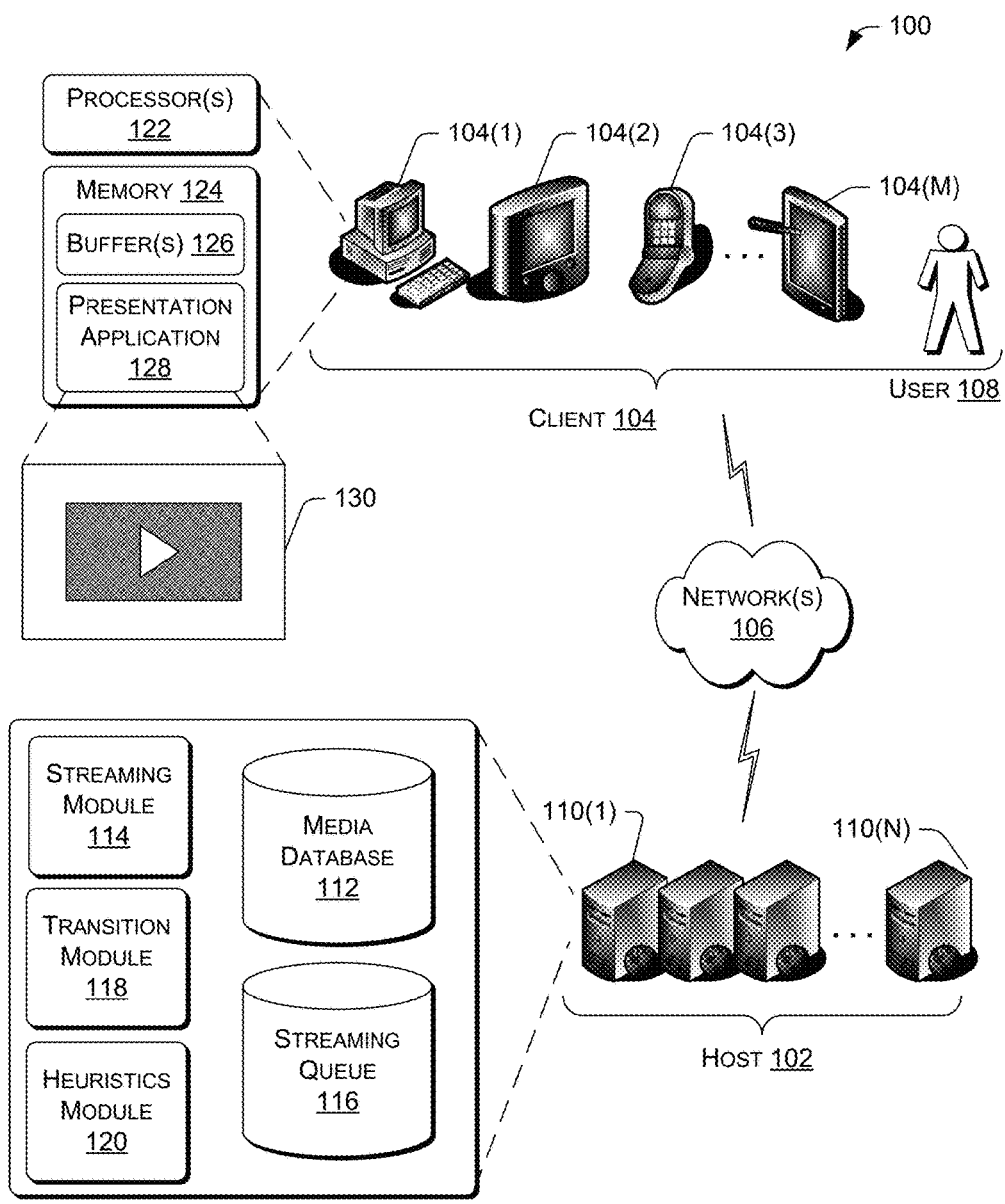
FIG. 1 is a pictorial diagram showing an illustrative computing environment in which one or more embodiments of client side stream switching may be implemented.

FIG. 1 is a pictorial diagram showing an illustrative computing environment 100 in which one or more embodiments of client side stream switching may be implemented. In the environment 100, a host 102 may be in communication with a client 104 via a network 106. In embodiments, the host 102 may transmit streaming media to the client 104 for playback to a user 108.

In accordance with one or more embodiments, the host 102 may include one or more servers 110(1), . . . , 110(N), perhaps arranged in a cluster or as a server farm. The host 102 may be a web server or another type of information server. Other server architectures may also be used to support the host 102. The host 102 is capable of handling requests from many users and serving, in response, various streams of data that can be rendered at the client 104. In some embodiments, the host 102 is a web server that supports user interaction, including online retailers, entertainment sites, audio and/or video distribution sites, informational sites, social networking sites, blog sites, news and entertainment sites, and so forth.

In the illustrative environment, the host 102 represents a web server that hosts a media database 112. The media database 112 stores a collection of media which may be transmitted from the host 102 to the client 104 via the network 106 for playback to the user 108. The term "media" includes any video and/or audio which may be streamed to the user 108, such as movies, television shows, previews, personal video recordings, music, news, or any other type of video and/or audio which may be streamed over the network 106 from the host 102 to the client 104.

In FIG. 1, the host 102 may include a streaming module 114 to transmit content of the media database 112 to the user 108. In some embodiments, the streaming module 114 may include one or more video renderers that enable display of the video to the users 108. In addition, the streaming module 114 may manage one or more buffers for storing content of the media database 112. In one or more embodiments, the streaming module 114 may interact with a streaming queue 116 to manage buffers, store content, or otherwise maintain media from the media database 112 that is processed by the streaming module 114.

In accordance with one or more embodiments, a transition module 118 may interact with the streaming queue 116 to transition from a stream of media at a first bit rate to a stream of media at a second bit rate. For example and without limitation, the stream of media at the first bit rate may be a video clip encoded at 600 kbps while the stream of media at the second bit rate may be the same clip encoded at 900 kbps. Therefore, the content of the stream of media may be the same while the quality (pixels, resolution, audio compression, etc.) may be different. The transition module 118 may cause the host 102 to facilitate a continuous streaming transition from the stream of media at the first bit rate to the stream of media at the second bit rate while maintaining an uninterrupted or substantially uninterrupted stream of media to the client 104 for playback to the user 108.

A heuristics module 120 may provide data to assist in the transition process provided by the transition module 118 and/or the streaming process provided by the streaming module 114. For example, the heuristics module 120 may determine when to begin filling a buffer with streaming media from the media database 112 to enable the client 104 to receive uninterrupted streaming content. In some embodiments, the heuristics module 120 may determine an ideal bit rate for streaming media based on a measured bandwidth of the network 106, among other possible factors. The heuristics module 120 may dynamically control the selection of the bit rate of the media content to provide the highest bit rate media stream to the user 108 based on the measured bandwidth.

In accordance with one or more embodiments, one or more of the streaming module 114, the transition module 118, and the heuristics module 120 may be implemented on the client 104. The client 104 may include at least a portion of the functionality of the streaming module 114. For example, the client 104 may include an application which includes rendering software to receive a stream of media and output it for playback to the user 108. In addition, the client 104 may include the transition module 118 for transitioning between a first stream of media and a second stream of media. In some embodiments, all or a portion of the functionality of the heuristics module 120 may be implemented on the client 104. For example, the functionality of the heuristics module 120 that calculates the ideal bit rate may be implemented on the client 104 to enable a client side measurement of the bandwidth of the network 106 to determine the ideal bit rate for streaming media.

The network 106 in FIG. 1 may be a Local Area Network ("LAN"), a larger network such as a Wide Area Network ("WAN"), or a collection of networks, such as the Internet. Protocols for network communication, such as TCP/IP, are well known to those skilled in the art of computer networks and may be used to implement the network connections described herein. Persons of ordinary skill in the art will recognize that the concepts disclosed herein may also be used in other interactive environments, such as local or wide area networks that connect servers storing related documents and associated files, scripts, and databases, or broadcast communication networks that include set-top boxes or other information appliances providing access to audio or video files, documents, scripts, databases, etc.

As discussed above, the client 104 may receive media content from the host 102. The client may include a computer 104(1), a television 104(2) (via a receiver), a mobile telephone 104(3) (e.g., smart phone, etc.), a portable digital assistant (PDA) 104(M), or other devices capable of receiving streaming media from the host 102 and displaying and/or emitting the streaming media for consumption by the user 108. For example, the client 104 may also be a set-top box, a game console, and so forth.

As illustrated, each client 104(1), . . . , 104(M) is equipped with one or more processors 122 and memory 124 to store data and applications and to process data. The memory 124 may include one or more buffers 126 to store data, such as streaming media received from the host 102. According to some embodiments, a presentation application 128 is stored in the memory 124 and executes on the processor 122 to provide streaming media from the host 102. The presentation application 128 may render streaming media 130 served by the host 102 on an associated display of the client 104. For example, the presentation application 128 may be a browser configured with a media streaming plug-in which is capable of processing and playing the streaming media 130. In some embodiments, the presentation application 128 may include all or a portion of the streaming module 114, the transition module 118, and/or the heuristics module 120.

In some embodiments, the configuration of the host 102 and the client 104 may be structured as a web based system, or other types of client/server-based communications and associated application logic could be used such as a cable-television head-end and television set-top box environment, a digital video recorder with corresponding remote service provider, a mobile device and corresponding remote service provider, among other possibilities. When the user 108 accesses the host 102, the client 104 submits a request, such as in the form of a uniform resource locator (URL), to the servers 110(1)-(N). Upon receiving the request, the servers 110(1)-(N) return streaming media to the client 104.

Illustrative Operation

Figure 2:
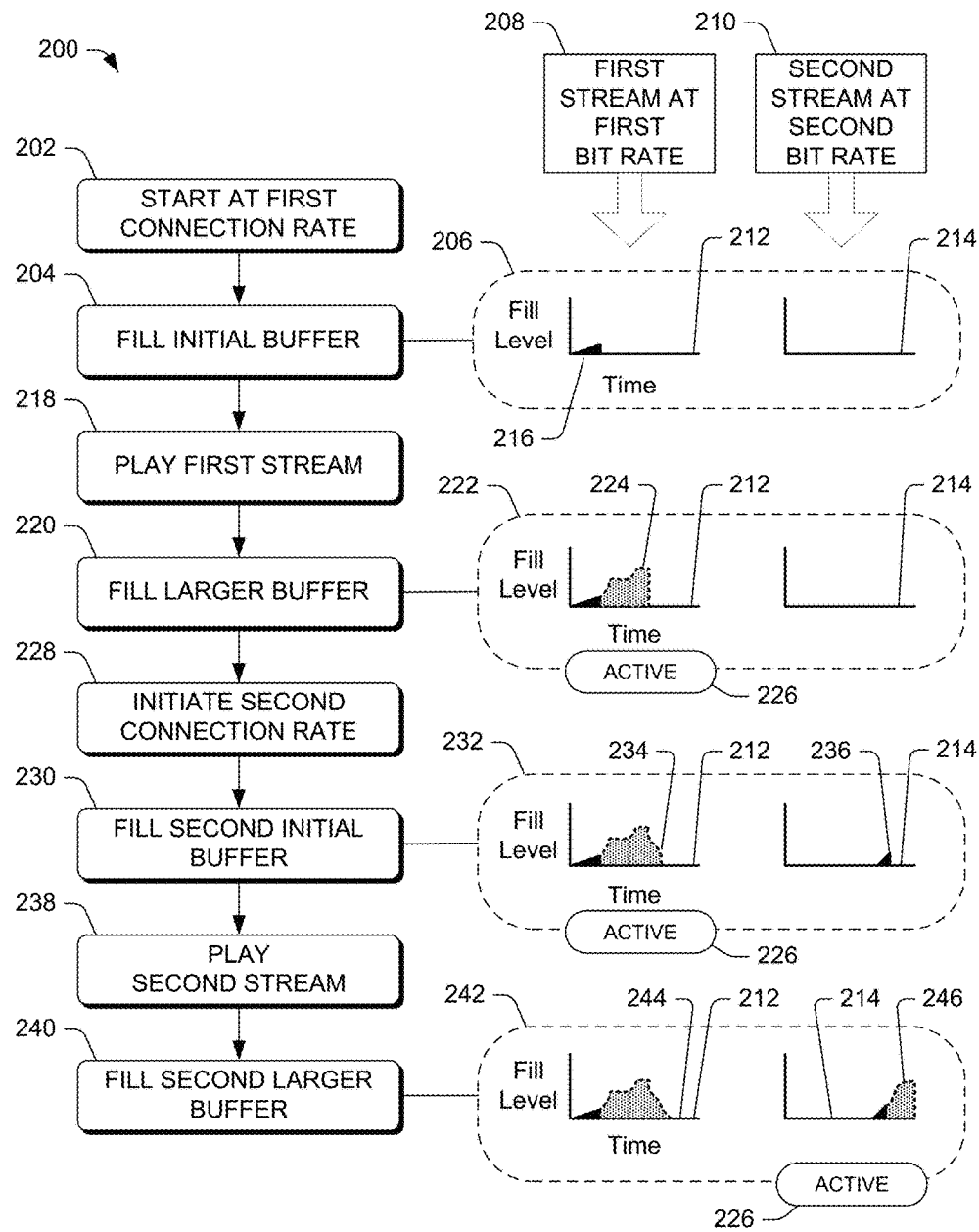
FIG. 2 is a flow diagram of an illustrative process of stream switching in accordance with one or more embodiments of the disclosure.

FIG. 2 is a flow diagram of an illustrative process 200 of stream switching in accordance with one or more embodiments of the disclosure. The process 200 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 200 is described with reference to the environment 100 of FIG. 1. Other processes described throughout this disclosure, in addition to process 200, shall be interpreted accordingly.

The process 200 may begin at 202 by initiating a connection between the host 102 and the client 104 via the network 106 at a first connection rate. For example, the streaming module 114 may provide streaming media encoded at different bit rates, such as 500 kbps, 1000 kbps, and 1500 kbps, although other bit rates may be used including more or fewer bit rates. At 202, the client 104 may establish a connection with the host 102 to enable receipt of the streaming media at a first bit rate.

In accordance with one or more embodiments, at 204 the host 102 may transmit streaming media to the client 104 at the first bit rate to fill an initial buffer, such as one of the buffers 126. A first activity monitor 206 includes a graphical representation of activity associated with a first stream 208 having a first bit rate and a second stream 210 having a second bit rate. Illustrative activity associated with the first stream 208 and the second stream 210 is represented on a first graph 212 and a second graph 214, respectively. The first graph 212 and the second graph 214 include a fill level (i.e., an amount of data in the buffer) on the y-axis and time on the x-axis and are used to plot the buffer activity for each stream of media. As shown in the first graph 212, the initial buffer of the client 104 is filled with streaming media by the operation 204. An initial buffer fill 216 represents an illustrative fill level of streaming media over time during the operation 204.

At 218, the presentation application 128 begins to play the first stream 208 when the initial buffer fill level reaches an initial buffer capacity from the operation 204. At 220, a larger buffer may be initiated and filled with streaming data from the host 102. The larger buffer may be one of the buffers 126 which includes a higher capacity than the initial buffer. In some embodiments, the larger buffer may be the same buffer as the initial buffer but with a larger capacity. A second activity monitor 222 shows a larger buffer fill 224 representing the large buffer storing streaming media, which exceeds the capacity of the initial buffer as shown in the initial buffer fill 216. An active indicator 226 indicates that the first stream 208 is used to provide the streaming media at the operation 218.

In accordance with some embodiments, at 228 a second connection rate may be initiated between the client 104 and the host 102. For example, the host 102 may determine that the bandwidth provided by the network 106 between the host and the client 104 is large enough to support streaming the second stream 210 of media having a higher bit rate than the bit rate of the first stream 208, thus enabling an output of a higher quality stream of media to the user 108. Alternatively, the host 102 may determine that the bandwidth is constricted and may only support streaming the second stream 210 having a lower bit rate than the bit rate of the first stream 208 in order to support an uninterrupted stream of media. Therefore, the host 102 may configure and initiate the second stream 210 for transmission to the client 104 at 228.

At 230, the second stream may begin to fill an initial buffer, such as one of the buffers 126 residing on the client 104. A third activity monitor 232 shows the first graph 212 continuing to monitor a reduced large buffer fill 234 while the second graph 214 shows a second initial buffer fill 236 associated with the initial buffer provided by the second stream 210. The presentation application 128 may continue to play the first stream at 230 as indicated by the active indicator 226 under the third activity monitor 232.

At 238, the presentation application 128 begins to play the second stream 210 when the second initial buffer fill level reaches an initial capacity from the operation 230. At 240, a second large buffer is initiated and filled with streaming data from the host 102. The second large buffer may be one of the buffers 126 which includes a higher capacity and stores data provided by the second stream 210. For example, the larger buffer may be the same buffer as the initial buffer but with a larger capacity. A fourth activity monitor 242 shows an empty large buffer fill 244 which depicts the first stream 208 as reduced to a fill level of zero bytes while the second graph 214 shows a larger second buffer fill 246. The active indicator 226 indicates that the second stream 210 is used to provide the streaming media at the operation 238.

Although the process 200 generally describes the second stream 210 as having a higher bit rate than the bit rate of the first stream 208, the process may also operate by transitioning from the bit rate of the first stream to a lower bit rate associated with the second stream. Therefore, the process 200 generally illustrates a transition from a first stream with a first bit rate to a second stream with a second bit rate, where the second bit rate may be higher or lower than the first bit rate.

Figure 3:
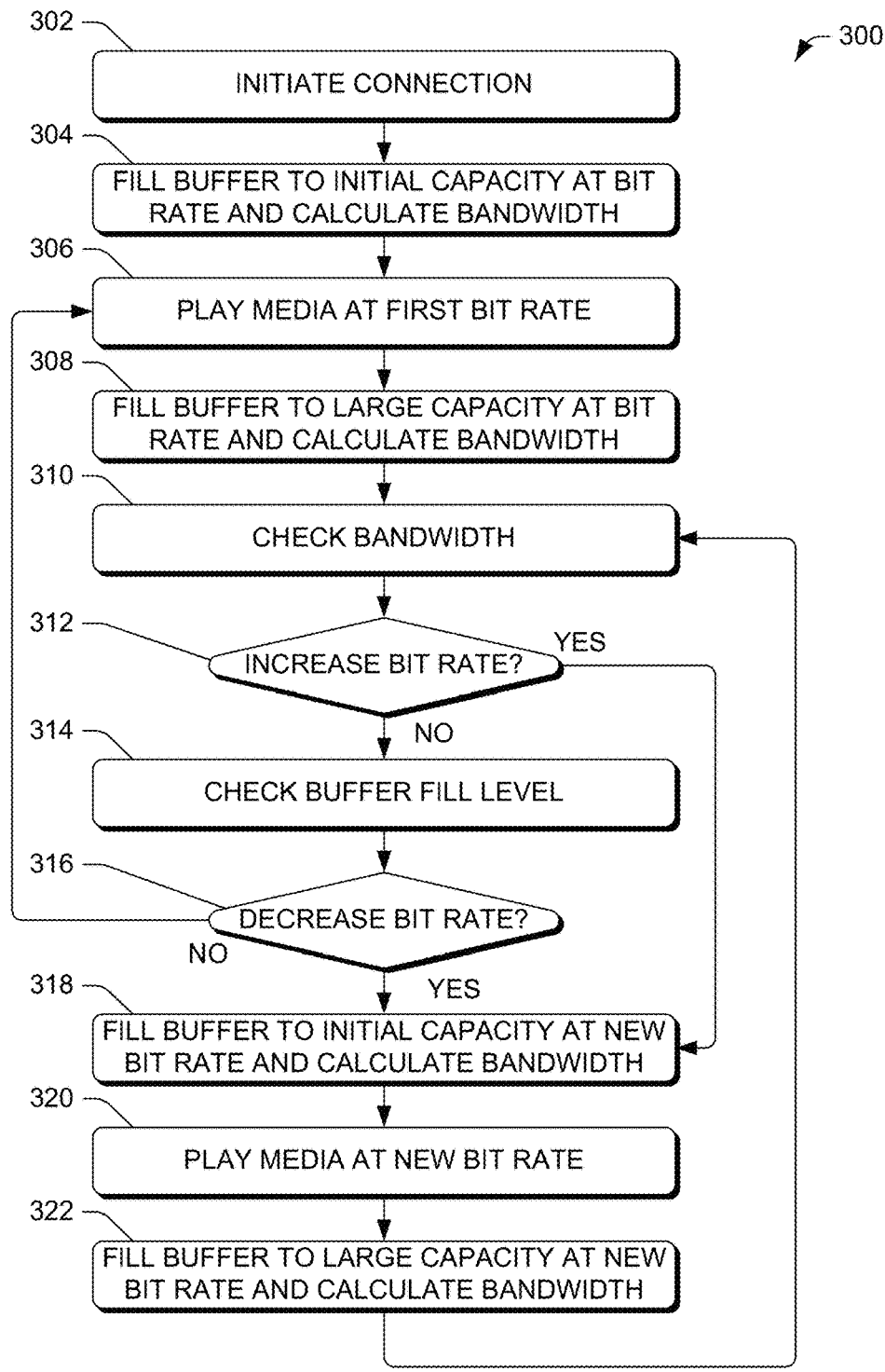
FIG. 3 is a flow diagram of an illustrative process of monitoring bandwidth and selecting a bit rate in accordance with some embodiments of the disclosure.

FIG. 3 is a flow diagram of an illustrative process 300 of monitoring bandwidth and selecting a bit rate in accordance with some embodiments of the disclosure. The order in which operations of the process 300 are described is not intended to be construed as a limitation, and any number of the described blocks can be combined in any order and/or in parallel to implement the process. For discussion purposes, the process 300 is described with reference to the environment 100 of FIG. 1.

At 302, the host 102 initiates a connection with the client 104 via the network 106. In some embodiments, the host 102 may determine the bandwidth of the connection, such as by analyzing the network connection, using a previous bandwidth determination, or by other known techniques. At 304, the host 102 may stream media at a first bit rate to fill an initial buffer residing on the client 104. As previously described above, the host 102 may include streams of media encoded at many different bit rates for a single piece of content. The streaming module 114 may select the highest possible bit rate of media for streaming to the client 104 to provide the highest quality of media while maintaining an uninterrupted or a substantially uninterrupted stream of media. In some embodiments, a first stream of media may include a relatively low bit rate value to ensure uninterrupted or substantially uninterrupted streaming of media. For example, if the host 102 has four encoded bit rate versions of the stream of media, the host may transmit the lowest or second to lowest bit rate stream of media to the client 104 during the operation 304. The initial buffer may include a predetermined capacity based on time or data size for the first stream of media. In some embodiments, the initial buffer may include two to five seconds of the first stream of media while other amounts of streaming media may be stored in the initial buffer depending on the type of media (e.g., audio and/or video) and resolution of the media (e.g., low definition, high definition, etc).

In some embodiments, the host 102 may calculate the bandwidth of the network connection with the client 104 at 304. For example, the host 102 may determine how long the client 104 takes to fill the initial buffer having a known data size. The calculated bandwidth may be used to determine an ideal bit rate that may be used to select a second bit rate, which will be discussed in greater detail below.

In accordance with one or more embodiments, at 306 the first stream of media is outputted to the user 108. For example, the client 104 may play the first stream of media using data stored in the initial buffer once the initial buffer is filled to capacity. In some embodiments, the client 104 may not play the media until the initial buffer is full, thereby ensuring that the user experiences uninterrupted or substantially uninterrupted streaming of media on the presentation application 128. Therefore, the size of the initial buffer is selected to ensure a receipt of uninterrupted or substantially uninterrupted streaming of media by the user 108 once the user begins to receive an output of the stream of media.

At 308, the host 102 may stream media at the first bit rate to fill a larger buffer residing on the client 104. The larger buffer may be the same buffer which stores data as the initial buffer, but with a larger capacity. For example, the initial buffer may be a threshold determination for indicating when the stream may be played at the operation 306. Alternatively, the larger buffer may be a different buffer than the initial buffer. Regardless of the configuration, the initial buffer and the larger buffer may enable the client 104 to provide an uninterrupted or substantially uninterrupted stream of media to the user. Similar to the operation 304, the host 102 may calculate the bandwidth of the network connection with the client 104 at 308. In some embodiments of the process 300, the bandwidth may be calculated at the operation 304, the operation 308, or both.

At 310, the host 102 may periodically calculate the bandwidth using a system bandwidth check in addition to or without measuring the buffer fill rate as discussed above. For example, the host 102 may transmit packets of data having known data sizes to the client 104. The client 104 may transmit return messages to the host 102 upon receipt of each of the packets of data, thus enabling the host to calculate the bandwidth of the network connection between the host and the client. Other known techniques of calculating the bandwidth may be used by the host 102. The bandwidth calculation may occur at a fixed interval, periodically, or after a predetermined event. For example, the bandwidth calculation may occur one or more times every second to continuously monitor the network bandwidth.

In accordance with one or more embodiments, the host 102 determines whether to increase the bit rate of the stream at 312. The bit rate may be increased if the measured bandwidth supports an available higher bit rate stream of media. If a higher bit rate is feasible as determined at 312, the host 102 may determine a status of the buffer fill level at 314. For example, the client 104 may monitor the buffer fill level of the larger buffer. If the larger buffer includes a low fill level or a reducing fill level, the buffer may eventually run empty which may cause an undesirable interruption in the stream of media. If the buffer fill level is relatively low, the process 300 may preemptively decide to decrease the bit rate at 316.

In some embodiments, the buffer fill level may have a predetermined minimum threshold referred to as a watermark. The host 102, via the client 104, may monitor the buffer fill level and determine when the buffer fill level drops below the watermark. In some embodiments, the heuristics module 120 may perform a statistical analysis of the buffer's activity to determine if the buffer's fill level is likely to reach zero bytes. For example, the client may take periodic samples such as consecutive snapshots of the buffer's fill level after the buffer fill level drops below the watermark. Continuous periodic samples that indicate a decline in the buffer fill level may initiate the host 102 to begin streaming a reduced bit rate stream to the client 104. However, if the statistical analysis determines the buffer fill level will not run empty, the bit rate may remain unchanged and the process 300 may continue streaming at the first bit rate, such as at the operation 306.

At 318, the host 102 may stream media having a new bit rate to the client 104 for storage in one of the buffers 126 to fill an initial buffer. The new bit rate may be selected by the heuristics module 120 of FIG. 1 based on the bandwidth of the network connection between the host 102 and the client 104, among other possible factors. For example, the host 102 may determine whether the bandwidth can support a higher bit rate (i.e., decision at the operation 312 is "yes") or the bandwidth cannot support the current stream bit rate and the bit rate needs to be lowered (i.e., decision at the operation 316 is "yes").

In some embodiments, the heuristics module 120 may select the most appropriate available bit rate for the stream to provide uninterrupted or substantially uninterrupted streaming of media to the user 108 while maintaining the highest quality of media. For example, the host 102 may include a piece of media which is encoded in five different bit rates designated as A, B, C, D, and E where "A" is the lowest bit rate and "E" is the highest bit rate. The client 104 may initially play the stream at the bit rate "C" at 306. Next, the buffer fill level may drop below the watermark. The heuristics module 120 may determine that the bit rate should be adjusted to either bit rate "A" or bit rate "B" based on the measured bandwidth at one or more of the operations 304, 308, and 310. In some embodiments, the heuristics module 120 may selectively determine an ideal bit rate which may be used to select a new bit rate. The new bit rate may not be a next sized bit rate that is available (either higher or lower than the current bit rate), thus allowing the host 102 to jump to another bit rate that does not have the next higher or lower bit rate.

At 320, the client 104 plays the new stream of media having the new bit rate once the initial buffer is full. At 322, a larger buffer is filled with streaming media having the new bit rate, similar to the operation at 308. The process 300 may indefinitely continue to monitor the bandwidth and make adjustments to the bit rate at the operations 310-322.

Figure 4:
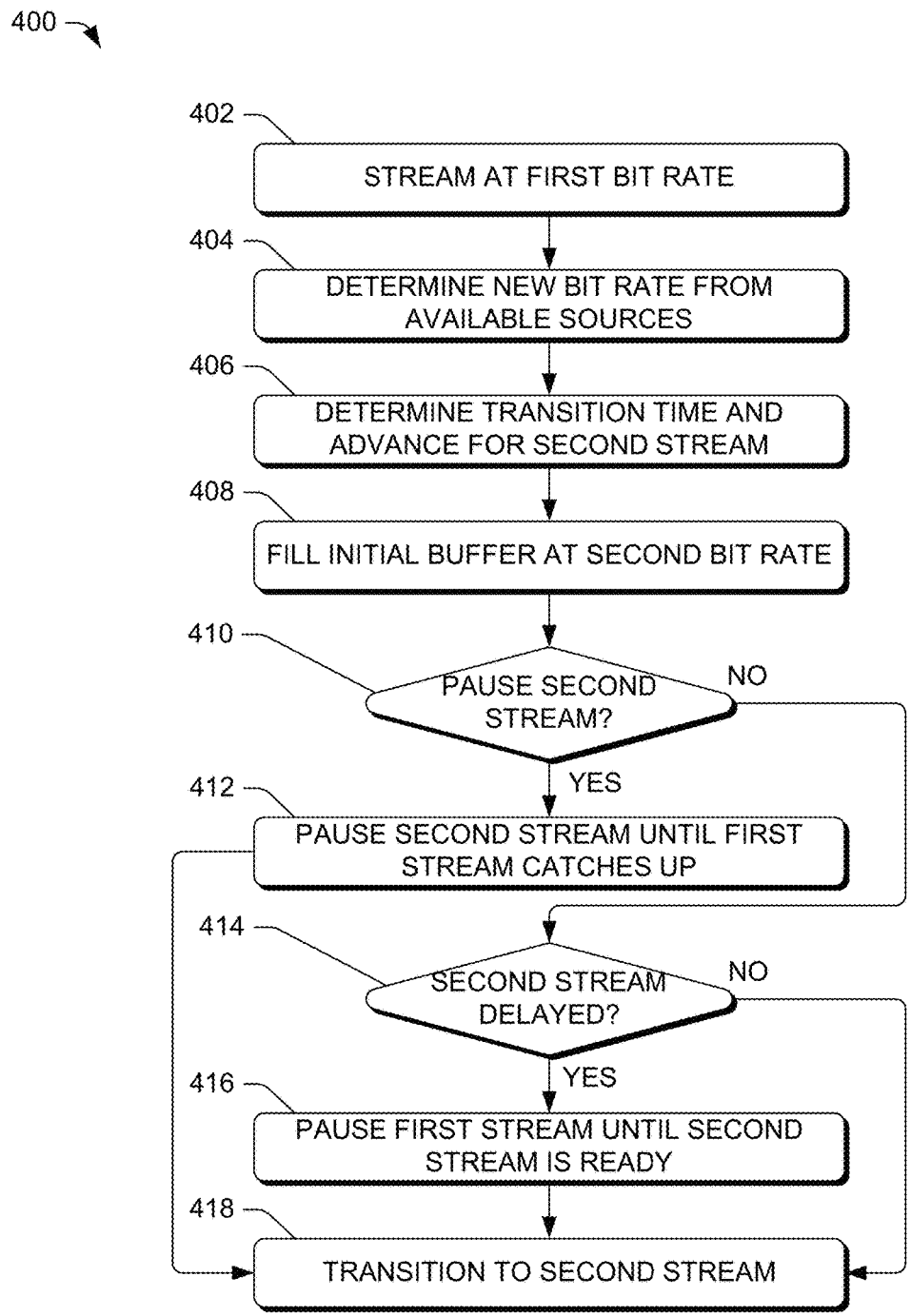
FIG. 4 is a flow diagram of an illustrative process of transitioning from a first stream to a second stream in accordance with one or more embodiments of the disclosure.

FIG. 4 is a flow diagram of an illustrative process of transitioning from a first stream to a second stream in accordance with one or more embodiments of the disclosure. The order in which operations of the process 400 are described is not intended to be construed as a limitation, and any number of the described blocks can be combined in any order and/or in parallel to implement the process.

In accordance with one or more embodiments, at 402 the host 102 streams media at a first bit rate. At 404, the host 102 may determine a second bit rate may provide an improved user experience by providing a higher quality of media to the user or by providing a lower quality of media to reduce or eliminate possible interruptions in the stream of media. At 406, the heuristics module 120 may determine a transition runtime and advance the second stream of media to fill the buffer for the transition runtime. For example, a stream may be transmitted to the user which is viewed at a runtime of 1:12.00 (m:ss). In order to fill the initial buffer before starting the second bit rate stream of media, the heuristics module 120 may determine that the stream runtime range from 1:14.00 to 1:17.00 may need to be loaded in the buffer based on factors such as the time necessary to fill a second initial buffer, and so forth. In the example, the host would have two seconds (2.00) to fill the initial buffer and then synchronize a transition from the first bit rate stream to the second bit rate stream with a minimized or no perceivable interruption of the stream of media.

At 408, the host 102 fills the initial buffer at the second bit rate. At 410, the host determines if the second bit rate stream needs to be paused in order to synchronize with the first bit rate stream. The second stream is paused by the streaming module 114 at 412 until the first bit rate stream catches up to the start time of the second stream. However, if the second stream does not require pausing, the host 102 may determine at 414 if the second stream is delayed. If the second stream is delayed, at 416 the streaming module 114 may pause the first stream until the initial buffer is filled with the second bit rate stream. In some embodiments, the heuristics module 120 may be adjusted to minimize the occurrence of the operation 416 by providing more time for the initial buffer to fill with the second bit rate stream, thus minimizing the likelihood of interruptions of the media to the user 108. In some embodiments, the heuristics module 120 may use historical data, such as previous buffer fill rates, to predict a stream fill delay. For example, a sample of the previous fill rates may be stored, analyzed, and used to compute a future fill rate necessary to implement an uninterrupted transition from a first stream of media to a second stream of media, thus avoiding the stream fill delay.

In accordance with one or more embodiments, at 418 the transition module 118 may enable the client 104 to transition from the first bit rate stream of media to the second bit rate stream of media. The transition module 118 may provide the highest bit rate to the user 108 for the longest time possible without causing an interruption. For example, when the client 104 is downgrading to a lower bit rate, the higher bit rate stream (first bit rate) may be provided to the client until the higher bit rate stream is no longer available (i.e., larger buffer for first stream is reduced to zero bytes), at which point a synchronized transition to the lower bit rate stream may occur.

In some embodiments, the transition module 118 may cross-fade the first stream into the second stream over a period of time to gradually transition from the first stream to the second stream. Cross-fading may lessen a user perceivable change from the first stream to the second stream. The transition module 118 may cross-fade the streams by overlaying a second renderer over a first renderer, where the first renderer is gradually dimmed in while the second renderer is gradually intensified. Additionally or alternatively, the transition module 118 may transition audio using one or more cross-fades. For example, the video may be dimmed/intensified using two renderers while the audio may be cross-faded by adjusting volume on input sources to create a fade-in/fade-out effect of audio. In further embodiments, cross-fading may assist in providing an uninterrupted stream of media when the end of the first stream and the beginning of the second stream are not exactly simultaneous in run-time.

Figure 5:
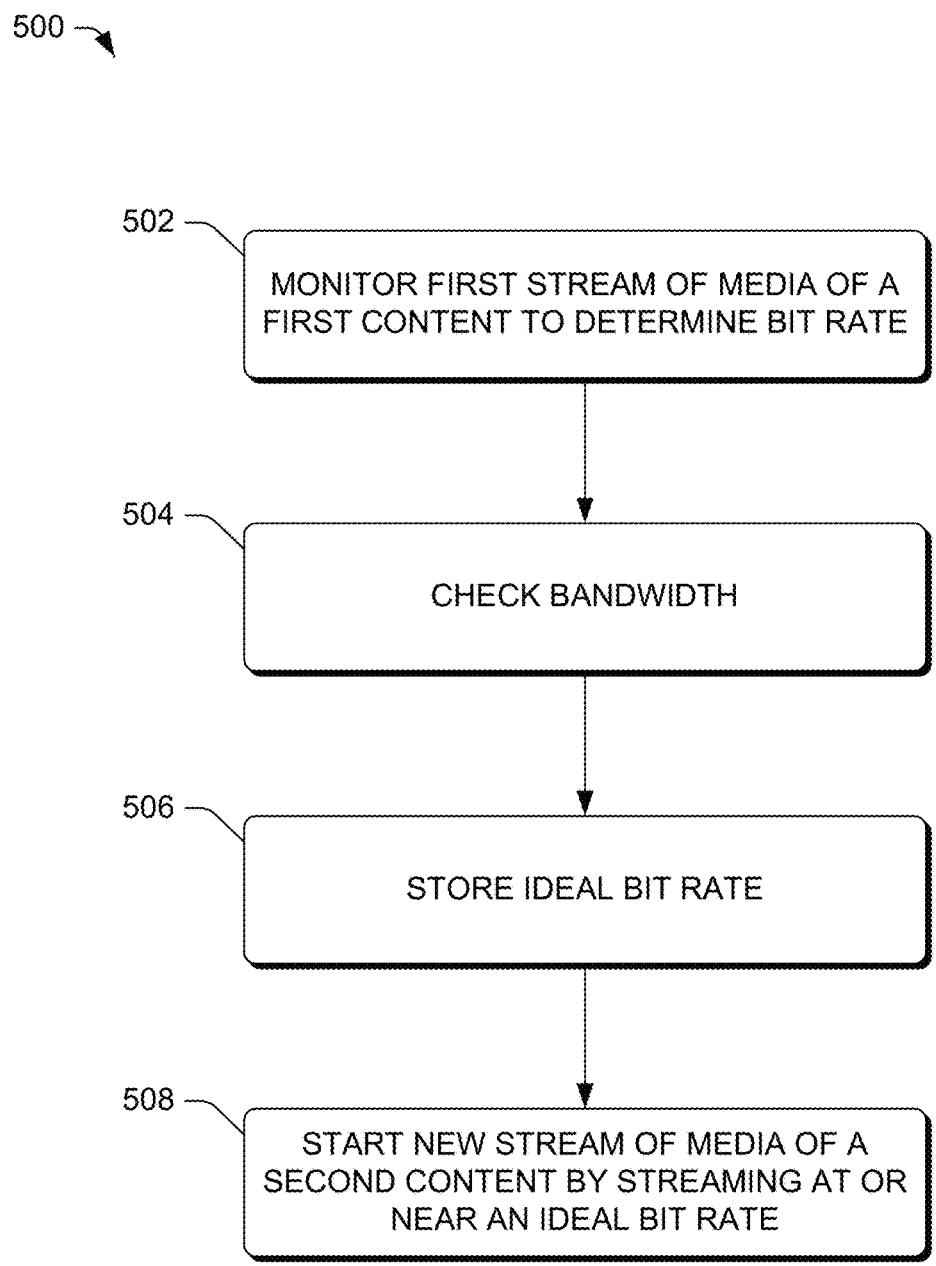
FIG. 5 is a flow diagram of an illustrative process of determining and storing an ideal bit rate for a client in accordance with one or more embodiments of the disclosure.

FIG. 5 is a flow diagram of an illustrative process 500 of determining and storing an ideal bit rate for a client in accordance with one or more embodiments of the disclosure. The order in which operations of the process 500 are described is not intended to be construed as a limitation, and any number of the described blocks can be combined in any order and/or in parallel to implement the process.

The host 102 may provide many different pieces of media from the media database 112 to the client 104 for output to the user 108. Often, the user 108 may desire to receive many pieces of media, such as when the user navigates a website and previews different sources of media. The process 500 may enable the host 102 to provide the highest bit rate of streaming media for the user 108 with previous streaming activity, typically during a continuous session of streaming different media content using the an established network connection.

At 502, the host 102 may monitor a first stream of media of a first content to determine the bit rate of the stream of media. At 504, the host may check the bandwidth of the network connection. For example, the host 102 may verify that the bit rate from the operation 502 is acceptable or the host may determine an ideal bit rate. The ideal bit rate may be the bit rate determined at the operation 502 or the ideal bit rate may be a new bit rate which is based off previous interactions between the host 102 and the client 104. At 506, the host 102 may store the ideal bit rate for streaming media to the client 104. Finally, at 508 the host 102 may initiate a new stream of media of a second content to the client 104 at or near the ideal bit rate.

Illustrative Analysis Tool

Figure 6:
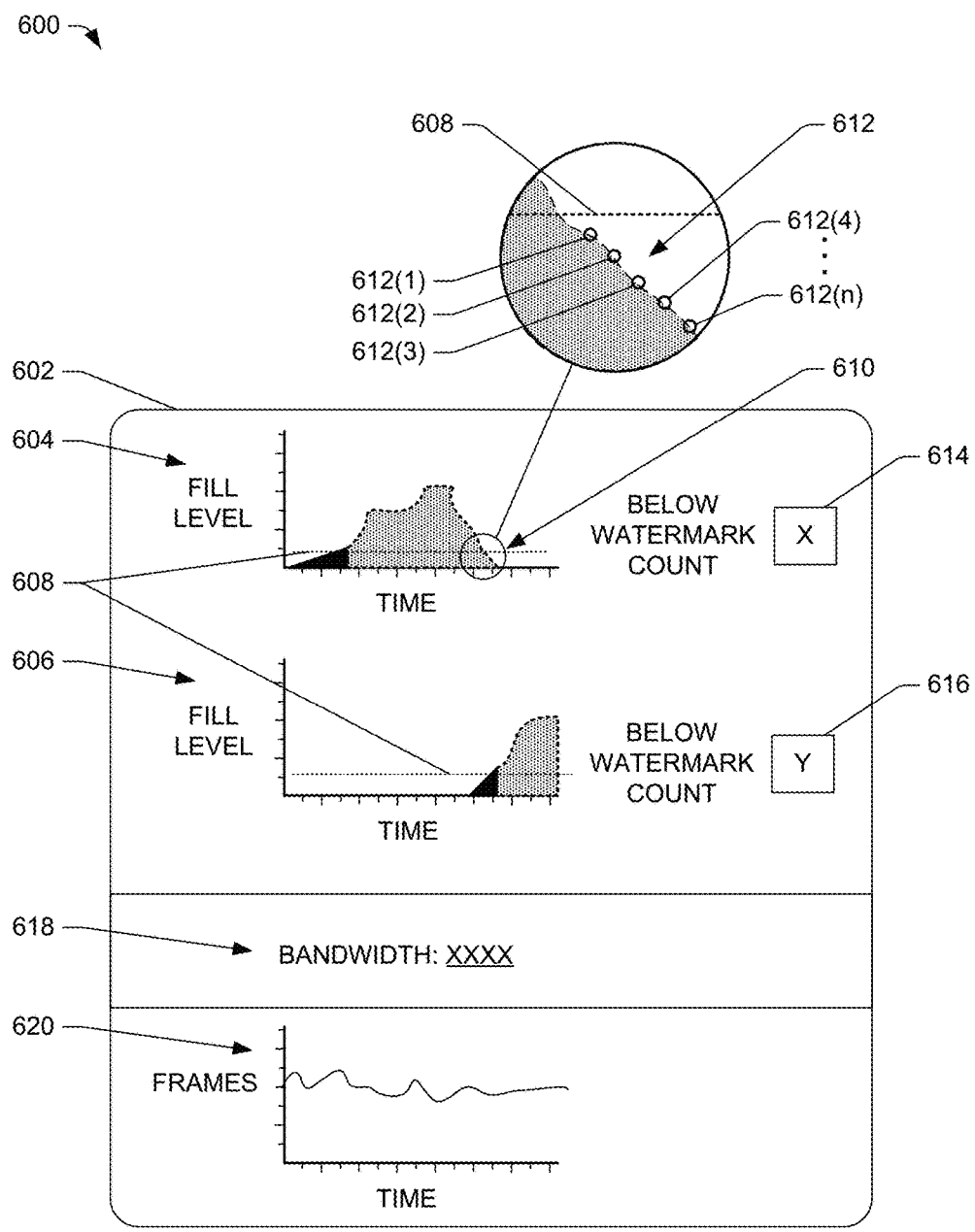
FIG. 6 shows an environment including an illustrative user interface to monitor streaming on a client in accordance with some embodiments of the disclosure.

FIG. 6 shows an environment 600 including an illustrative user interface 602 to monitor streaming on a client in accordance with some embodiments of the disclosure. The user interface 602 may be used for monitoring one or more streams of media which is transmitted from the host 102 to the client 104. The user interface 602 may enable a user interaction with the client 104 (e.g., by the user 108) and/or a user interaction with the host 102 to monitor and analyze streaming activities between the host and the client.

In accordance with one or more embodiments, the user interface 602 includes a first graph 604 to monitor a first stream and a second graph 606 to monitor a second stream. In other embodiments, more or fewer graphs may be implemented in the user interface 602 to monitor streams of media provided to the client by the host. In some embodiments, the first graph and second graph may display a watermark 608. For example, the watermark 608 may be used in the operation 314 of FIG. 3 to determine if the bit rate should be lowered for the stream of media that is provided to the client.

In the environment 600, a portion 610 of the first graph 604 is magnified to show further details for illustrative purposes. The portion 610 shows the graph of the larger buffer as it drops below the watermark 608. As described above with relation to the operation 314, the heuristics module 120 may perform a statistical analysis of the buffer's activity to determine if the buffer's fill level is likely to reach zero bytes. For example, the client may take periodic samples 612 of the buffer's fill level after the buffer fill level drops below the watermark. Continuous periodic samples 612(1), . . . , 612(*n*) may initiate the host 102 to begin streaming a stream of media with a reduced bit rate to the client 104. The first graph 604 may include a first counter 614 to provide outputs for activity of the periodic samples 612. For example, the first counter 614 may count the number of consecutive declines in the buffer fill level as determined from the periodic samples 612. Similarly, a second counter 616 may be associated with the second stream and the second graph.

At 618, the user interface may output the measured bandwidth of the network connection between the host 102 and the client 104. For example, the measured bandwidth may be obtained by the host 102 at the operations 304, 308, and/or 310. In addition, the user interface 602 may display a frames graph 620 which includes the number of frames displayed to the user 108 over time. In some embodiments, the user interface 602 may include user inputs. For example, a user input may enable the user to select the number of points 612 necessary for the initiation of a new bit rate stream. The user input may also enable the user to input the bandwidth 618.

Illustrative Stream Complexity Analysis

Figure 7:
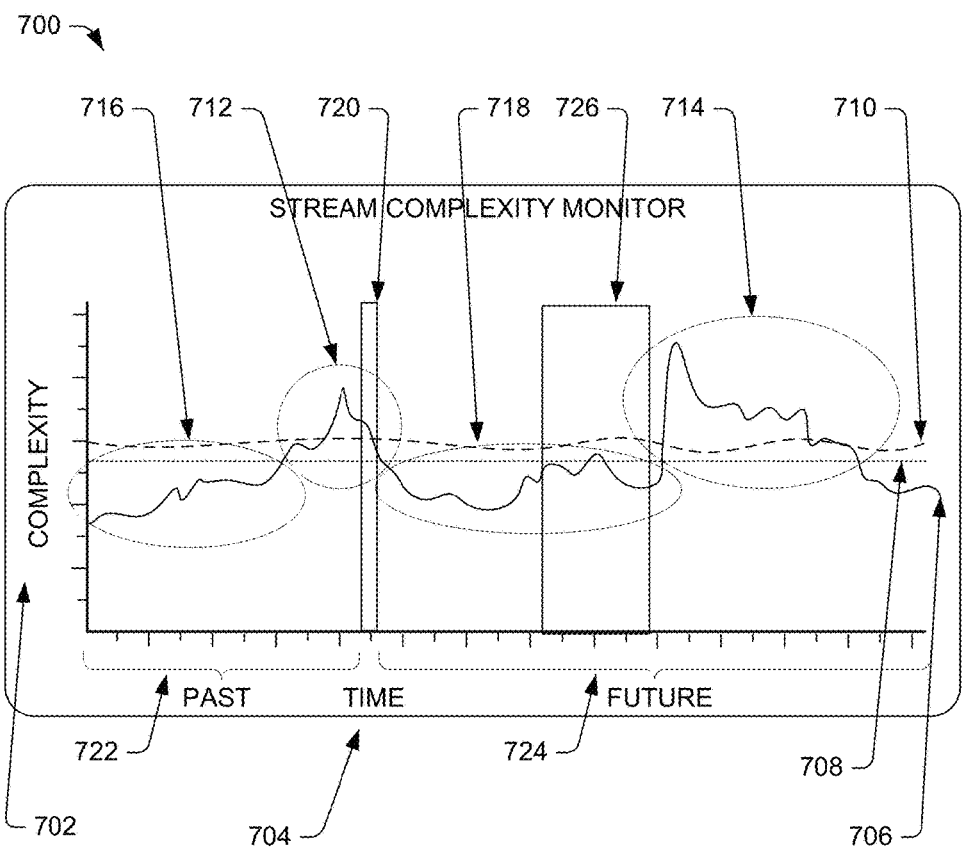
FIG. 7 shows an illustrative chart to analyze a stream of media to determine complexity of portions of a variable bit rate (VBR) stream of media in accordance with some embodiments of the disclosure.

FIG. 7 shows an illustrative chart 700 to analyze a stream of media to determine complexity of portions of a variable bit rate (VBR) stream of media in accordance with some embodiments of the disclosure. The chart 700 includes a complexity rating 702 plotted over a time value 704. The complexity 702 may be associated with a bit rate value.

In accordance with some embodiments, a stream of media may be analyzed to determine the complexity over time. For example, the heuristics module 120 may generate a stream complexity file which includes complexity information for a stream of media. In some embodiments, the stream complexity file may be transmitted from the host 102 to the client 104 to allow the client to determine the complexity of future portions of a stream of media. Alternatively or additionally, the host 102 may use the stream complexity file to adjust aspects of the streaming of media which is transmitted to the client, which may provide uninterrupted streaming media to the user 108.

The complexity information may be plotted on the chart 700 as a VBR line 706. As discussed above, VBR streams of media may include a designated bit rate 708, which may be a median or an average bit rate value. The designated bit rate value 708 may be plotted on the chart 700. In some embodiments, a bandwidth line 710 may be represented on the chart 700. The bandwidth line 710 may represent a bit rate capacity of a network connection between the host 102 and the client 104 of FIG. 1.

An analysis of the VBR line 706 may show complex portions such as a first complex portion 712 and a second complex portion 714. The complex portions 712, 714 may include portions where the bit rate for the stream of media is higher than the designated bit rate value. In some instances, the complex portions 712, 714 may include a higher bit rate than the bandwidth line 710 which may result in a depletion of the buffer fill because streaming the media may be outputted to the user 108 faster than the buffer 126 can be filled by streaming media from the host 102. If the complex portions 712, 714 have a longer duration than the buffer capacity can support, the buffer may be depleted without further action by the host 102 or the client 104.

In addition, the VBR line 706 may show low complexity portions such as a first low complexity portion 716 and a second low complexity portion 718. When the low complexity portions 716, 718 are streamed from the host 102 to the client 104, the buffer 126 may fill faster than the stream of media is played back to the user 108, thus allowing replenishment of a buffer that has a low fill level. In some embodiments, the buffer 126 may store enough of the stream of media to enable uninterrupted streaming of media without adjusting the bit rate value using the process 200 of FIG. 2. However, in some embodiments, the buffer may be depleted when a long duration of a complex portion, such as the second complex portion 714, is streamed to the client 104, without further action by the streaming module 114 or the transition module 118.

In accordance with one or more embodiments, the heuristics module 120 may generate a stream complexity file which includes the information represented by the VBR line 706 having complexity versus time. For example, the file may include a bit rate value for a period of the stream of media, such as every second or another period of time. In some embodiments, the stream complexity file may be used by the transition module 118 to determine when to transition from a first bit rate stream of media to a second bit rate stream of media. For example, an analysis of the stream complexity file may result in the transition module 118 creating a transition from the first bit rate to the second bit rate when the time corresponds to the start of the second complex portion 714, while the buffer 126 may be large enough to sustain the first bit rate during streaming of the first complex portion 712.

In some embodiments, the streaming module may expand the capacity of the buffer 126 based on an analysis of the stream complexity file. For example, an expanded buffer capacity may be filled with streaming media during the second low complexity portion 718 to enable the buffer to provide streaming media during the second complex portion 714 without depleting the fill level of the buffer to zero bytes of data or another minimum threshold. In some embodiments, a combination of expanding the buffer size and transitioning to a second bit rate stream of media may enable output of an uninterrupted stream of media to the user 108.

In accordance with one or more embodiments, the stream complexity file may be used while streaming media by periodically referencing the VBR line 706 while the stream of media is played back to the user 108. A stream time 720 may be included in the chart 700. The output time may be the time the stream of media is played back to the user or it may be the time when the stream of media is used to fill the buffer 126. For illustrative purposes, the stream time 720 will be described as the time when the stream of media is used to fill the buffer 126. For reference, the time value 704 before the stream time 720 is a past time 722, while the time after the stream time is a future time 724.

A future time window 726 may be included in the chart 700. The future time window 726 may be used to monitor the VBR line 706 at the future time 724. In some embodiments, the future time window 726 may be selected at a future time relative to the stream time which corresponds with the buffer capacity. For example, if the buffer capacity is 30 seconds of streaming media, the future time window 726 may include a segment of the VBR line 706 before and after 30 seconds, such as the duration of 15 seconds to 45 seconds, although other buffer capacities and future time window values may be used. In some embodiments, the transition module 118 may use information in the future time window to create a transition from a first bit rate to a second bit rate. Additionally or alternatively, the streaming module 114 may expand the buffer capacity based on the future time window 726.

Figure 8:
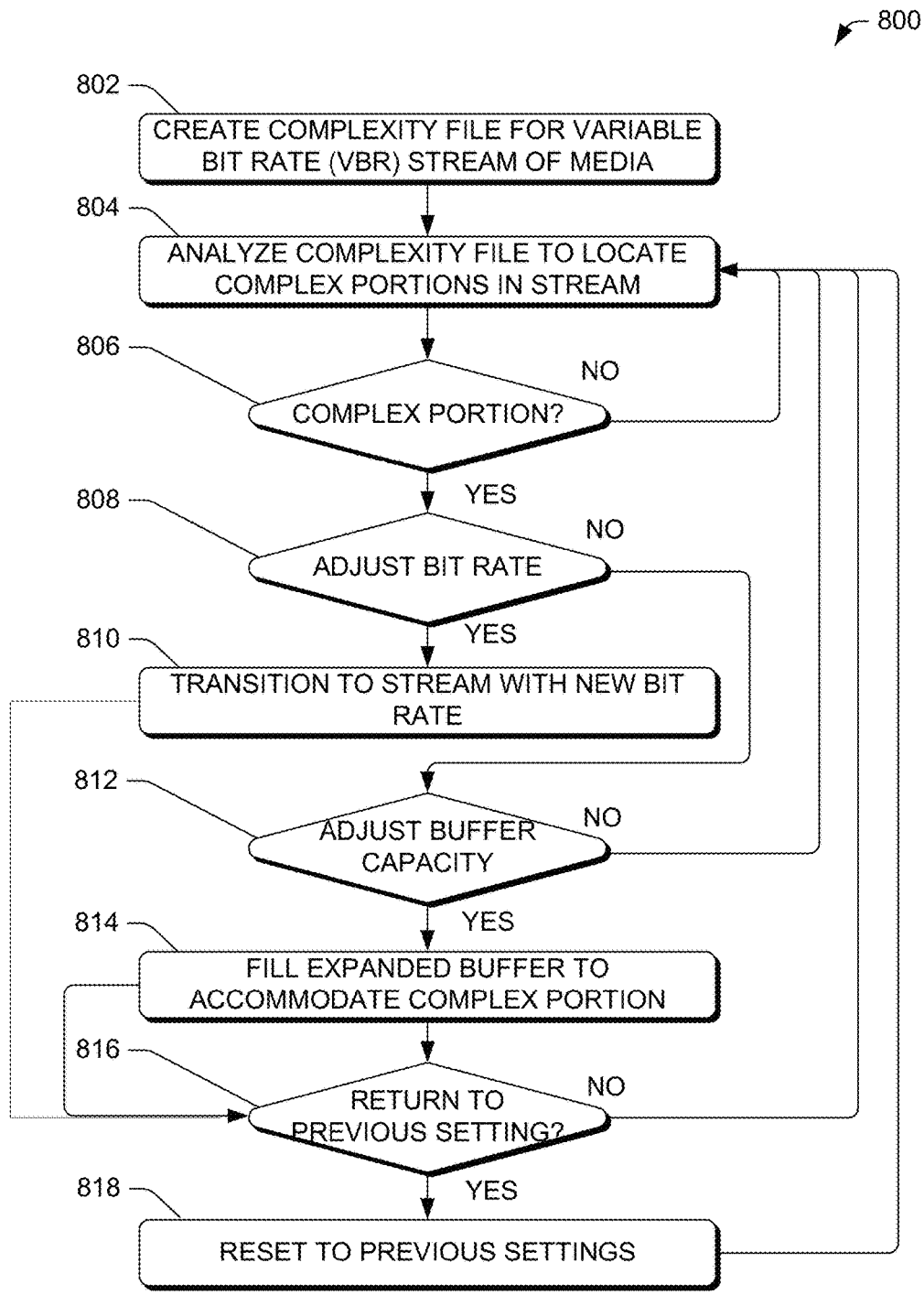
FIG. 8 is a flow diagram of an illustrative process of using an analysis of a stream of media having complexity data to adjust streaming to a client in accordance with one or more embodiments of the disclosure.

FIG. 8 is a flow diagram of an illustrative process 800 of using an analysis of a stream of media having complexity data to adjust streaming to a client in accordance with one or more embodiments of the disclosure. The order in which operations of the process 800 are described is not intended to be construed as a limitation, and any number of the described blocks can be combined in any order and/or in parallel to implement the process. For discussion purposes, the process 800 is described with reference to the environment 100 of FIG. 1.

In accordance with some embodiments, at 802 the heuristics module 120 may create a stream complexity file for a variable bit rate (VBR) stream of media. For example, the heuristics module 120 may create a stream complexity file for each encoding of the streams of media in the media database 112. At 804, the heuristics module 120 may analyze the stream complexity file to locate complex portions in the stream, such as the first complex portion 712 and the second complex portion 714 of FIG. 7. The operation 804 may occur once for the stream of media or the operation 804 may occur periodically for the stream of media by using the future time window 726.

If a complex portion is located at 806, the transition module 118 may adjust the bit rate at 808. However, if a complex portion is not located at the operation 806, the process 800 may return to the operation 804 and analyze the stream complexity file while streaming media from the host 102 to the client 104. Returning to the operation 808, the transition module 118 may determine that a bit rate adjustment is necessary and may transition to a new stream with a new bit rate at 810. The new stream may include a new stream complexity file, which may be generated by the heuristics module at the operation 802.

In some embodiments, the streaming module 114 may determine whether to adjust the buffer capacity at 812. For example, the stream complexity file may indicate that an expanded buffer may enable providing uninterrupted streaming media to the user 108 without transitioning to a new stream with a new bit rate. The streaming module 114 may fill the expanded buffer to accommodate the complex portion at 814. Alternatively, the streaming module may not adjust the buffer capacity at the operation 812 and the process 800 may continue by analyzing the stream complexity file at the operation 804.

If the expanded buffer is filled at the operation 814 or the transition module 118 transitions to the new stream with the new bit rate at the operation 810, the process 816 may return the buffer capacity and/or the stream of media back to the previous settings once the complex portion has been streamed from the host 102 to the client 104. For example, the process 800 may enable providing the highest quality stream of media to the user by returning to a higher bit rate stream of media at the operation 818 once the complex portion has been streamed to the client. Finally, the process 800 may return to the operation 804 to analyze the stream complexity file, such as when the process uses a periodic loop to implement the data in the stream complexity module to provide uninterrupted streaming media for playback to the user 108.

In some embodiments, the heuristics module 120 may analyze the stream complexity file to determine the ideal bit rate for the operation 810. For example, the heuristics module 120 may process the data of the stream complexity file at a bandwidth of the network connection to create various scenarios of buffer fill levels during the VBR runtime of the stream of media. This analysis may enable selection of an ideal bit rate which does not deplete the buffer fill. In addition, the analysis may determine an expanded buffer capacity which may be implemented to avoid depleting the buffer fill. As discussed above, one or more embodiments may enable the streaming module 114 to provide uninterrupted streaming media by using an expanded buffer capacity, switching to a new bit rate, or both.

Illustrative Operation

Figure 9:
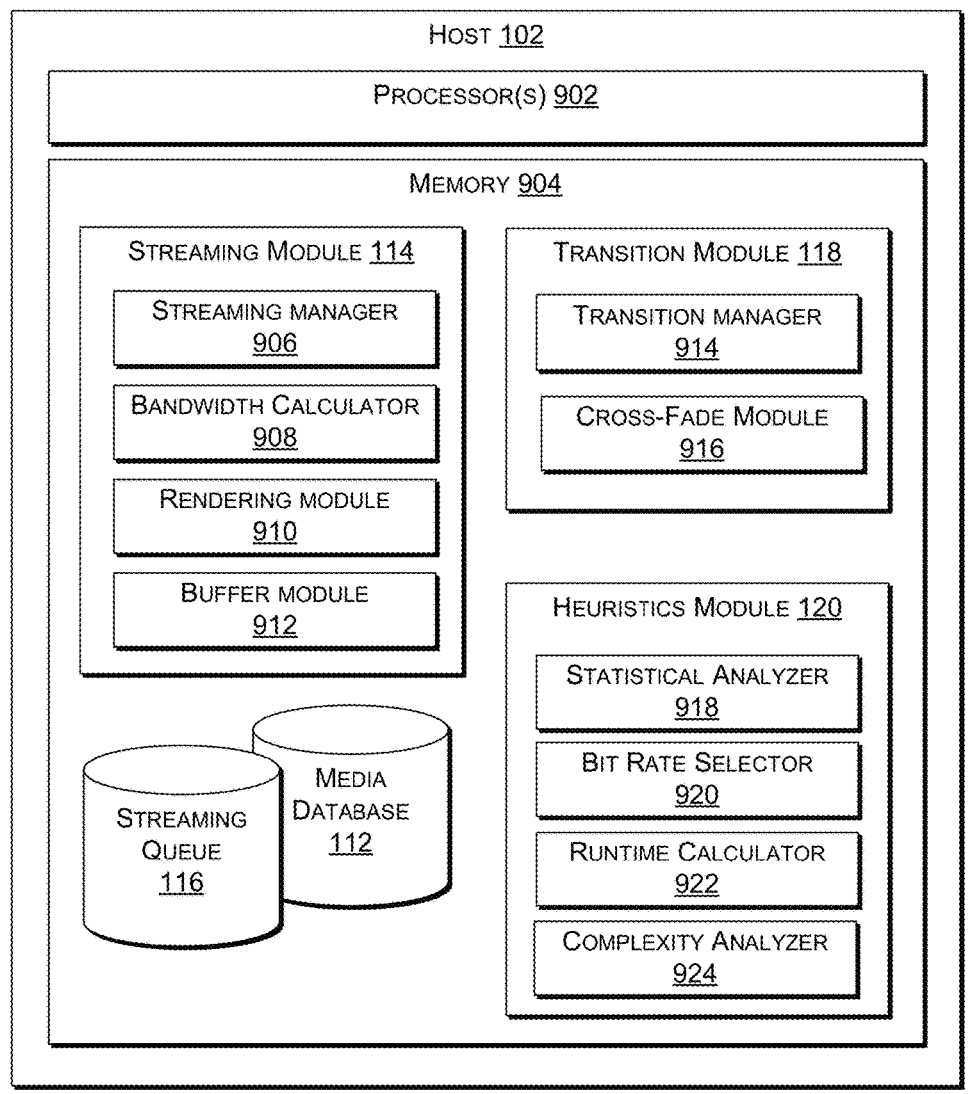
FIG. 9 shows a block diagram illustrating one or more embodiments of modules associated with the host server of FIG. 1.

FIG. 9 shows a block diagram of an architecture 900 illustrating one or more embodiments of modules associated with the host server 102 of FIG. 1. The architecture 900 includes one or more processors 902 and memory 904 containing instructions that are executable by the one or more processors 902.

In accordance with some embodiments, the streaming module 114 may include a streaming manager 906. The streaming manager 906 may provide streaming media at different bit rates which have been encoded and reside in the media database 112 and/or the streaming queue 116. In some embodiments, the streaming manager 906 may modify a media, such as a lossy media file before streaming the media, thus removing the need to maintain multiple files for each instance of media content.

A bandwidth calculator 908 may be used to calculate the bandwidth of the network connection between the host 102 and the client 104, such as described in the operations 304, 308, and 310. A rendering module 910 may provide a visual or auditory output to the client 104 for playback by the presentation application 128. A buffer module 912 may monitor and/or analyze the buffer activity on the client, such as the buffers 126.

In some embodiments, the transition module 118 may include a transition manager 914 to cause the host 102 to transition a continuous stream from a first stream of media to a second stream of media while maintaining an uninterrupted stream of media to the client 104 for playback to the user 108. The transition manager may be configured to provide the highest bit rate to the user for the longest time possible without causing an interruption in the stream of media. A cross-fade module 916 may be used to gradually cross-fade audio and/or video, such as by dimming a first video renderer provided by the renderer module 910 while intensifying a second video renderer.

In one or more embodiments, the heuristics module 120 may include a statistical analyzer 918. The statistical analyzer 918 may perform a statistical analysis of the buffer's activity to determine if the buffer's fill level is likely to reach zero bytes. For example, the statistical analyzer may analyze periodic samples of the buffer's fill level after the buffer fill level drops below the watermark. A bit rate selector 920 may determine an ideal bit rate for streaming media based on a measured bandwidth of the network 106. The heuristics module 120 may dynamically control the selection of the bit rate of the media content to provide the highest bit rate stream of media to the user 108 based on the measured bandwidth, among other factors, thus selecting an ideal bit rate rather than selecting an adjacent bit rate in every instance. A runtime calculator 922 may calculate a runtime start at a future runtime for a second stream based on a time necessary to transition to the second stream including time to fill an initial buffer, thus enabling an uninterrupted transition to the second stream of media. A complexity analyzer 924 may create a stream complexity file based on a variable bit rate stream of media. In addition, the complexity module may enable selecting an ideal bit rate or expanded buffer capacity to enable providing uninterrupted streaming media to the user 108 when the stream of media includes complex portions which may otherwise deplete the buffer.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
  filling a first buffer of a client to an initial capacity at a first bit rate with a first stream of media from a host;
  playing the first stream of media when the first buffer is filled to the initial capacity;
  filling the first buffer to a larger capacity substantially simultaneous to playing the first stream of media;

monitoring a status of a fill level of the first buffer;
determining based at least in part on the monitoring that the first buffer will be exhausted and result in an interruption in rendering of the first stream of media;
filling a second buffer of the client that is different from the first buffer to an initial capacity with a second stream of media from the host substantially simultaneous to playing the first stream of media from the first buffer, the second stream of media having a same content and lower bit rate than the first stream of media;
determining that the fill level of the first buffer falls below a watermark;
measuring, in response to the fill level of the first buffer falling below the watermark, at least one additional sample of the fill level of the first buffer; and
synchronizing, in response to the fill level and the at least one additional sample of the first buffer falling below the watermark, a transition from playing the first stream of media to playing the second stream of media from the second buffer.

2. The method as recited in claim 1, further comprising:
playing the first stream of media until the first buffer is empty; and
transitioning from playing the first stream of media to playing the second stream of media from the second buffer.

3. The method as recited in claim 1, wherein the at least one additional sample of the fill level of the first buffer indicates that the fill level of the first buffer will reach zero bytes.

4. The method as recited in claim 1, further comprising:
determining a bandwidth between the client and the host; and
determining that the bandwidth supports a higher bit rate that is higher than the first bit rate of the first stream of media; and
switching to a third stream of media from the host having the higher bit rate.

5. The method as recited in claim 4, further comprising playing the third stream of media after a third buffer, different from the first and second buffers, used to store the third stream of media is filled to an initial capacity.

6. The method as recited in claim 4, wherein the bandwidth is determined based at least in part on a fill rate of the first buffer or a bandwidth of a network connection used to stream the media from the host to the client.

7. The method as recited in claim 4, further comprising:
determining an ideal bit rate based on at least one of the bandwidth or the fill level of the first buffer; and
selecting the second stream of media or the third stream of media based to play at least in part on comparison of a bit rate of the second stream of media or of a bit rate of the third stream of media to the ideal bit rate.

8. The method as recited in claim 7, further comprising using the ideal bit rate to predict an initial bit rate of a different stream of media content from the host to the client.

9. One or more non-transitory computer-readable media storing computer-executable instructions that, when executed on one or more processors, cause a computing system to perform acts comprising:
transmitting a first stream of media through a network connection to a first buffer at a first bit rate;
determining an excess bandwidth capacity of the network connection;
determining an ideal bit rate based at least in part on an amount of the excess bandwidth capacity;
initiating a second stream of media through the network connection to a second buffer, different from the first buffer, at a second bit rate to fill an initial capacity of the second buffer, the second stream of media having a same content as the first stream of media and the second bit rate being determined based at least in part on the ideal bit rate;
determining that a fill level of the first buffer falls below a watermark;
measuring, in response to the fill level of the first buffer falling below the watermark, at least one additional sample of the fill level of the first buffer; and
transitioning, in response to the fill level and the at least one additional sample of the first buffer falling below the watermark, an output from the first stream of media at the first bit rate stored in the first buffer to the second stream of media at the second bit rate stored in the second buffer.

10. The one or more non-transitory computer-readable media as recited in claim 9, wherein determining the ideal bit rate is further based on at least a decrease of the fill level of the first buffer.

11. The one or more non-transitory computer-readable media as recited in claim 10, wherein the second bit rate is selected from a group of predetermined bit rate values.

12. The one or more non-transitory computer-readable media as recited in claim 9, further comprising cross-fading an output of a first rendering module processing the first stream of media and an output of the second rending module processing the second stream of media to implement the transitioning from the first stream of media to the second stream of media.

13. The one or more non-transitory computer-readable media as recited in claim 9, wherein the second bit rate is a highest bit rate that can be output while avoiding an interruption of the output of the second stream of media, the highest bit rate based at least in part on the excess bandwidth capacity of the network connection.

14. The one or more non-transitory computer-readable media as recited in claim 9, further comprising selecting a future runtime start time for the second stream of media, the future runtime start time being equal to or later than the runtime of the first stream of media at the moment when the initial capacity of the second buffer is full.

15. A system, comprising:
one or more processors; and
memory having instructions executable by the one or more processors, the memory storing:
a streaming module to selectively access streams of media at a plurality of bit rates and transmit at least one of the streams of media to a client;
a heuristics module to use historical data comprising previous buffer fill rates to predict a stream fill delay, the heuristics module to determine an ideal bit rate of the streams of media for the client and to determine when to initiate a transition to the ideal bit rate based on a prediction of the stream fill delay; and
a transition module to transition streaming by the streaming module from a first stream of media encoded at an initial bit rate and stored at the client in a first buffer to a second stream of media encoded at the ideal bit rate and stored at the client in a second buffer different from the first buffer.

16. The system as recited in claim 15, wherein the streaming module comprises a first rendering module to output the first stream of media and a second rendering module to output the second stream of media.

17. The system as recited in claim 16, wherein the transition module cross-fades the output of the first rendering module with the output of the second rendering module.

18. The system as recited in claim 15, wherein the heuristics module determines the ideal bit rate by:
monitoring a fill level of the first buffer that is receiving the first stream of media;
determining, based at least in part on the monitoring, that the first buffer will reach zero bytes; and
selecting a lower bit rate than the initial bit rate as the ideal bit rate.

19. The system as recited in claim 15, wherein the heuristics module determines the ideal bit rate by:
monitoring bandwidth of a network between the system and the client;
determining, based at least in part on the monitoring, that the bandwidth is large enough to support a stream of media having a higher bit rate than the initial bit rate; and
selecting the higher bit rate as the ideal bit rate.

20. The method as recited in claim 1, further comprising measuring a number of consecutive declines in the fill level of the first buffer that are below the watermark.

\* \* \* \* \*